United States Patent Office 2,902,128
Patented Sept. 1, 1959

2,902,128

DRIVE MECHANISM

Byron B. Savage, Oklahoma City, Okla.

Application February 27, 1956, Serial No. 567,890

4 Claims. (Cl. 192—104)

This invention relates to an improved driving mechanism for limiting the speed of a device being driven by a variable speed power source, and for limiting the load imposed on the power source.

In the present day automobiles, many of the accessories are operated at variable speeds directly proportional to the speed of the automobile engine, even at high speeds of the engine; whereas the accessories should be operated at or below a maximum speed which is less than that now employed. For example, the ordinary automobile air conditioning compressor is designed to operate at its rated capacity when the automobile is being driven at a relatively low speed, such as 40 miles per hour. The present reasoning is that the compressor should do enough work at very low speeds of the automobile engine to provide sufficient cooling while the automobile is being driven in urban areas. As a result, when the automobile is being driven at high speeds, the compressor is driven at excessively high speeds beyond its rated capacity.

When the automobile is driven at these higher speeds, the load required to drive the compressor is excessive and subtracts from the total energy which should be available for transmission to the automobile wheels. Also, a compressor is frequently damaged by being operated at excessive speed, thereby shortening the service life of the automobile air conditioning system. It will be understood that the present automobile air conditioning compressors are connected by a direct drive to the automobile engine, usually by means of a belt and pulley arrangement, whereby the compressor speed is always directly proportional to the speed of the automobile engine.

The present invention contemplates a novel driving mechanism for connecting a power source, such as an automobile engine, to any suitable device or devices, such as a compressor, generator, fan, water pump and the like, in such a manner that the devices will, in effect, be directly connected to the power source at lower speeds of the power source, yet the devices will not be over-driven at the higher speeds of the power source. I contemplate utilizing two adjacent members having a floating disc interposed between the members to provide a friction connection between the members, wherein the floating disc is automatically positioned by centrifugal force. When the members are rotated at a relatively low speed, the disc provides a direct connection between the members by friction. However, when the members are rotated at increasing speeds, the disc is moved radially outward by centrifugal force to lessen the traction between the members and provide a slippage therebetween. When one of the members is driven by a power source and the opposite member is connected to the device being driven, the device being driven will attain a controlled maximum speed according to the design of my novel mechanism, regardless of how high the speed of the power source becomes. Thus, the present invention will limit the speed at which a device can be driven, and will limit the load imposed on the power source driving the device.

An important object of this invention is to increase the efficiency of devices (such as automobile air conditioning compressors) being driven by variable speed power sources.

An other object of this invention is to provide a driving mechanism which automatically limits the speed at which a device is operated, when the device is being driven by a variable speed power source.

Another object of this invention is to facilitate the design of devices being driven by variable speed power sources, whereby the devices may be constructed to operate at any desired maximum speed, with assurance that this maximum speed will not be exceeded.

A further object of this invention is to limit the load imposed on a power source which is driving a device at variable speeds, when the device is designed to be driven at a speed less than the maximum speed of the power source.

A still further object of this invention is to provide a novel variable speed driving mechanism with an automatic maximum speed control.

Another object of this invention is to provide a simply constructed driving mechanism which may be economically manufactured.

Other objects and advantages of the invention will be evident from the following detailed description, when read in conjunction with the accompanying drawings, which illustrate my invention.

Stated broadly, the present invention may be defined as an apparatus for limiting the speed of a shaft being rotated by a variable speed power source, and for limiting the load imposed on the power source, comprising a drive member rotatably disposed on the shaft and drivingly connected to the power source, a load member rigidly secured to the shaft in spaced relation to the drive member, and floating wedge means frictionally connecting the drive and load members for transmitting rotation of the drive member to the load member, said wedge means being movable by centrifugal force for decreasing the traction between the drive and load members at increasing speeds of rotation of the drive member and providing slippage of the load member with respect to the drive member.

Figure 1:
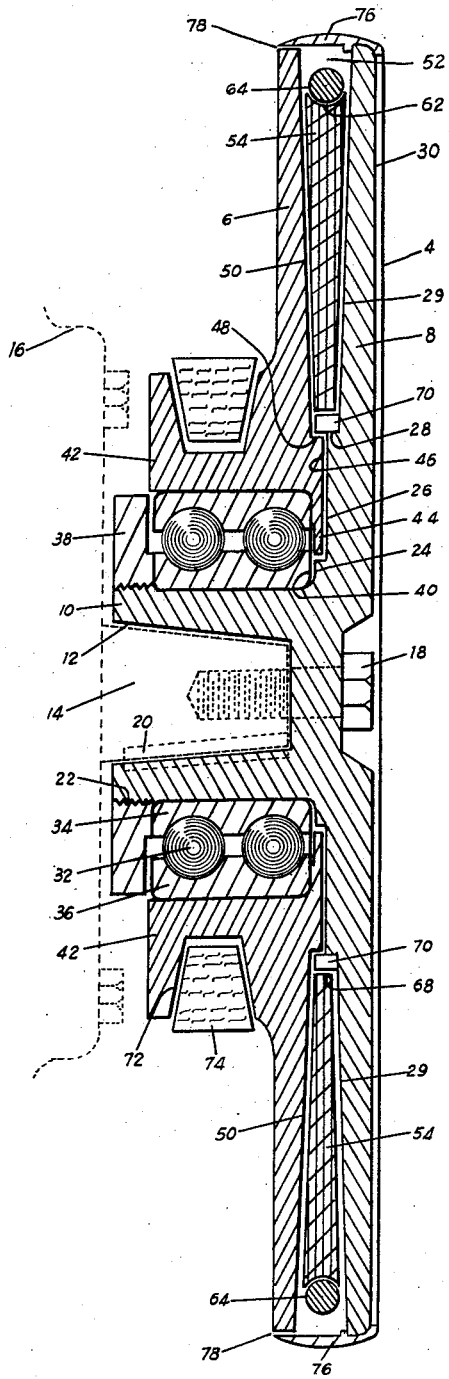
Figure 1 is a vertical sectional view through my novel driving mechanism shown assembled on the drive shaft of an automobile air conditioning compressor.

Referring to the drawings in detail, and particularly Figure 1, reference character 4 generally designates my novel driving mechanism, which comprises a driving member or plate 6, and a load plate or member 8. The load plate 8 extends radially outward from the outer end of a hub portion 10. The hub 10 has a tapered bore 12 extending partially therethrough, whereby the hub 10 may be mounted on the shaft 14 of a device being driven, such as a compressor or the like 16. A stud bolt 18 extends through the central portion of the load member 8 to engage the outer end of the shaft 14, and secure the plate 8 and hub 10 on the shaft. Also, a key 20 is preferably disposed in complementary key-ways in the hub 10 and shaft 14 to provide simultaneous rotation of the shaft 14 with the plate 8.

The outer periphery of the hub 10 is preferably machined, with external threads 22 being formed on the end thereof opposite the plate 8 for purposes that will be hereinafter set forth. A shoulder 24 is formed on the outer periphery of the hub 10 adjacent the plate 8 and provides a transition between the machined surface of the hub 10 and the inner face 26 of the plate 8. The face 26 is formed flat at right angles to the center line of the plate 8 and hub 10 between the shoulder 24 and another shoulder 28 disposed outwardly with respect to the shoulder 24. From the shoulder 28 the inner face 26 of the plate 8 is tapered outwardly at any desired angle, such as one degree, toward the outer face 30 of the plate 8 to provide an annular-shaped tapered portion 29.

A double row, end thrust, ball bearing assembly 32 is disposed on the hub 10 and comprises an inner bearing race 34 and an outer bearing race 36. The inner race 34 is of a size to fit tightly on the outer periphery of the hub 10, and a retaining nut 38 is threaded on the threads 22 to retain the bearing unit 32 in the desired position. When the bearing unit 32 is initially installed, it is preferably placed in such a position that the outer end 40 of the inner bearing race 34 is slightly spaced from the shoulder 24 of the load plate 8, for purposes that will be hereinafter set forth.

The outer bearing race 36 is of a size to tightly receive the hub portion 42 of the driving member 6. The driving member 6 is preferably in the form of a plate extending radially outward from the outer end of the hub portion 42 and having an outer diameter substantially corresponding to the outer diameter of the load plate 8. A circumferential flange 44 is formed on the inner face of the driving member 6 and extends radially inward, preferably in contact with the outer end of the outer bearing race 36. From the flange 44, the inner face 46 of the driving member 6 extends flat to a point slightly inward of the corresponding shoulder 28 of the load plate 8. The face 46 is then cut in toward the hub portion 42 to form a shoulder 48. From the shoulder 48, the face 46 is tapered outwardly at a predetermined angle, such as one degree, to form a tapered face 50 extending in an opposite direction to the tapered portion 29 of the load plate face 26. It will be observed that the tapered faces 29 and 50 provide a space 52 between the load member 8 and the driving member 6 which is substantially conically-shaped in cross-section, with the larger portion of the space 52 being at the outer peripheries of the driving and load members.

A disc-shaped member 54 is disposed in the space 52 to provide a friction contact between the driving member 6 and the load member 8. The opposite faces of the disc 54 are tapered at the same angle as the corresponding faces 29 and 50 of the load and driving members respectively to provide a wedge-shape in cross-section. The disc 54 is of a size to frictionally engage the tapered faces 29 and 50, when the disc 54 is in its innermost position as illustrated in Figure 1. It is preferred that the disc 54 be formed out of a brake material, such as asbestos slate of the type commonly used on automobile brake shoes.

Figure 2:
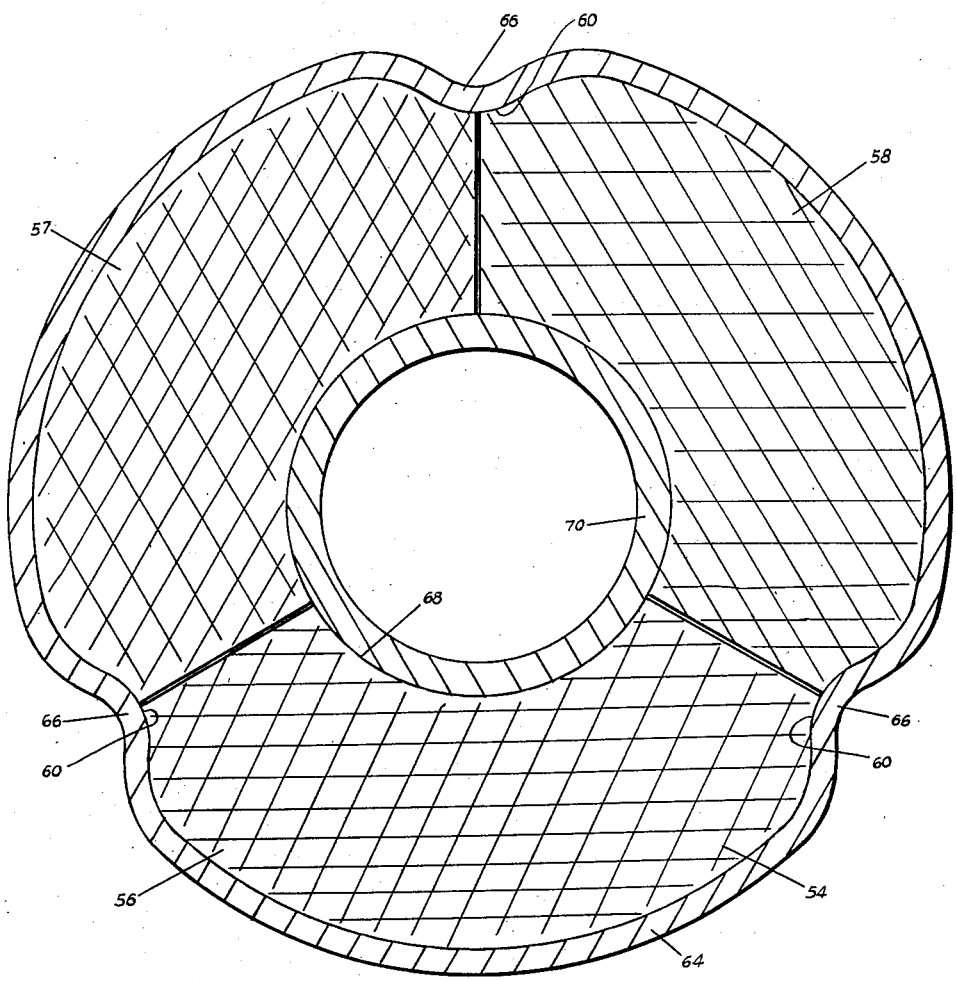
Figure 2 is a transverse sectional view through the floating disc which controls the speed of the driving apparatus.

As shown in Figure 2, the disc 54 is cut into three segments 56, 57, and 58, with each of the segments being of equal length and area to provide a completed disc 54 of annular configuration when viewed in elevation. Each end of each of the segments is curved inwardly at its outer periphery to provide three indentations 60 equally spaced around the periphery of the disc 54. Also, the outer periphery of each segment is provided with a groove 62 (see Fig. 1) to receive a circular-shaped spring 64. The spring 64 fits tightly in the groove 62 to retain the segments 56, 57, and 58 in assembly in a disc form. Also, the spring 64 has an indentation or crimp 66 (Fig. 2) conforming to each of the indentations 60 in the outer periphery of the disc 54, whereby the spring 64 may be stretched into more nearly circular configuration when the segments 56, 57, and 58 are moved outwardly by centrifugal force, as will be more fully hereinafter set forth.

The inner periphery of each of the disc segments 56, 57, and 58 is formed on the arc of a circle to provide an innerbore 68 through the disc 54 of a size to slidingly fit around a centering ring 70. The centering ring 70 (see also Fig. 1) fits tightly on the shoulder 28 of the load member 8 to rotate with the load member 8 during operation of the apparatus 4. The centering ring 70 supports the segments of the disc 54, and retains the disc 54 concentrically between the load and driving members, whereby the disc 54 may engage the tapered faces 29 and 50.

A circumferential, substantially V-shaped groove 72 (Fig. 1) is formed in the outer periphery of the outer hub 42 to receive an endless belt or the like 74 which extends from the power source (not shown). It will thus be apparent that the driving member 6 is directly engaged with the power source, such as an automobile engine, to operate the driving member 6 simultaneously with the power source. Any suitable pulley ratio may be used to provide the desired speed of rotation of the driving member 6, with respect to the speed of the power source.

*Operation*

As previously indicated, the driving member 6 will be driven by the power source through the medium of the belt 74 at a speed directly proportional to the speed of the power source. As the driving member 6 is rotated at low speeds, the spring 64 will retain the disc segments inwardly, and the disc 54 will be wedged into engagement with the tapered faces 29 and 50 of the load member 8 and driving member 6, respectively. As a result, the disc 54 transmits the torque of the driving member 6 to the load member 8, whereby the load member 8 is rotated simultaneously with the driving member 6. The rotation of the load member 8 is in turn transmitted to the shaft 14 of the compressor 16, whereby the compressor will be operated at the maximum possible speed during the lower speeds of operation of the power source. Also, the member 8 acts as a flywheel tending to maintain constant speed for the compressor 16.

As the speed of the driving member 6 is increased, the resulting centrifugal force created by the rotating mass of the segments 56, 57, and 58 of the disc 54, will tend to move the disc segments outwardly against the action of the circular spring 64. At some predetermined speed, depending upon the design of the spring 64, the disc segments 56, 57, and 58 will move radially outward to decrease the traction imposed on the opposite faces of the disc 54 by the tapered portions 29 and 50 of the load and driving members. At this time, some slippage will occur between the face 50 and the respective face of the disc 54, as well as the tapered face 29 and the opposite face of the disc 54. It will then be apparent that the driving member 6 will operate at a higher speed than the load member 8, to limit the maximum speed of operation of the compressor 16. The bearing assembly 32 permits the differential rotation between the driving and load members. When the speed of the driving member 6 is sufficiently great, the load member 8 will attain a maximum speed, which may be calculated to conform to the maximum designed speed of the compressor 16. If the driving member 6 is driven at a still higher speed, the disc segments 56, 57, and 58 will simply move outwardly to further decrease the friction on the faces 50 and 29 to provide a further differential speed or slippage between the driving and load members. When the speed of the driving member 6 is decreased, the spring 64 overcomes the centrifugal forces and wedges the disc 54 back between the tapered faces 29 and 50.

As a safety measure, I prefer to secure a guard ring 76 (Fig. 1) around the outer periphery of the load member 8, and extend the guard ring 76 over the spring 64, as well as over the outer periphery of the driving member 6. Therefore, if the spring 64 should break, the spring and disc segments will not be thrown out and no further damage would result. A slight clearance 78 should be provided between the outer periphery of the driving member 6 and the inner periphery of the guard ring 76 to prevent interference between rotation of the driving member 6 and load member 8.

During the lower speeds of rotation of the driving member 6, the circular spring 64 will retain the disc segments 56, 57, and 58 on the centering ring 70, and the centering ring 70 will tend to retain the disc segments centered between the tapered faces 29 and 50. Also, the width of the retaining ring 70 is preferably equal to the thickness of the disc 54 at its inner bore 68, to provide an even wear of the inner periphery of the disc segments. This wearing of the inner bore 68 of the disc 54 will at least partially compensate for the wear of the opposite faces of the disc 54, which will occur through use of the apparatus, whereby the disc 54 may move slightly inward during use and maintain contact with the tapered faces 29 and 50. It will also be observed from Figure 2 that a slight clearance is provided between the adjacent ends of the disc segments to permit this inward movement due to wear of the disc. If the inward movement of the disc 54 is not sufficient to compensate for the wear on the opposite faces of the disc, the retaining nut 38 may be further tightened to move the bearing unit 32 toward the loading member 8. It will be observed that the slight clearance between the outer end 40 of the inner bearing race 34 and the shoulder 24 will permit an adjustment of the bearing unit 32 on the hub 10. As the bearing unit 32 is moved on the hub portion 10 toward the shoulder 24, the outer bearing race 36 pushes against the flange 44 to simultaneously move the driving member 6 toward the load member 8. As a result, the space 52 is adjusted to bring the faces 29 and 50 into contact with the opposite faces of the disc 54. The flange 44 also functions to prevent grease from leaving the bearing unit 32 and entering the space 52.

One of the notable advantages of the present structure is that the apparatus is self-cooling. Since the driving and load members are plate-shaped, and extend outwardly from the hub portions 10 and 42, the members rotate freely in the air, and any heat generated by slippage between the members and the disc 54 will be carried off by convection. Also to be noted is that the speed limiting feature is automatically attained by the centrifugal force imposed on the segments of the disc 54 at the higher speeds of operation. It will be observed that the disc 54 simply floats between the driving and load members, and has no positive connection with any other portion of the apparatus.

From the foregoing it will be apparent that the present invention will prevent the over-speeding of automobile accessories such as air conditioning compressors. The tension of the circular spring may be designed to provide slippage between the driving and load members when the desired maximum speed of the device being driven has been reached. Also, the load imposed upon the power source will be limited, since no additional power will be drained from the power source when the designed maximum speed of the accessory has been reached. Furthermore, the apparatus can be driven by the power source through any desired connection, such as gears or a direct drive, rather than a belt driving system shown and described. For example, the drive plate could be mounted directly on the crankshaft of an automobile engine and the loading plate connected (by belts or the like) to several accessories. Also, of course, the direction of rotation of the load and driving members may be reversed. It will also be apparent that the present driving mechanism is simple in construction and may be economically manufactured.

Changes may be made in the combination and arrangement of parts as heretofore set forth in the specifications and shown in the drawings, it being understood that changes may be made in the precise embodiment shown without departing from the spirit and scope of the invention as set forth in the following claims.

I claim:

1. An apparatus for limiting the speed of a shaft being rotated by a power source, comprising a hub rigidly secured on the shaft, a load plate formed on one end of the hub and extending radially outward therefrom, a bearing unit having its inner race secured around the hub, a driving plate secured on the outer race of the bearing unit and extending radially outward therefrom, the adjacent faces of the load and driving plates being tapered in opposite directions with progressively greater spacing therebetween toward the outer peripheries of the plates, an annular segmented disc disposed between the load and driving plates and having a cross-section conforming to the spacing between the plates, the adjacent surfaces of said disc and said plates being smooth to provide only face-to-face contact between said disc and said plates, a spring encircling the disc for yieldingly retaining the disc segments inwardly against centrifugal force into frictional engagement with the load and driving plates, and means adapted to connect the driving plate to the power source for rotating the driving plate at various speeds, whereby the load plate rotates with the driving plate at low speeds and the segments of the disc move radially outward by centrifugal force against the spring to provide increasing slippage of the disc and load plate at increasing speeds of the driving plate.

2. An apparatus for transmitting torque, comprising a circular-shaped driving plate, a circular-shaped load plate, means for rotatably supporting the driving and load plates in axial alignment and a fixed distance apart, opposed annular areas on the adjacent faces of said plates being tapered in opposite directions to provide a progressively increasing spacing between the plates from the inner toward the outer peripheries of said annular areas, an annular segmented disc positioned between said annular areas and having its opposite faces tapered in the same directions as the respective adjacent faces of the driving and load plates, and spring means urging the segments of the disc inwardly toward the centers of the driving and load plates for wedging the disc between said annular areas and drivingly connecting said plates, the segments of said disc being engaged with both of said plates only by face-to-face contact between the opposite faces of the segments and the respective annular tapered areas of said plates.

3. Apparatus as defined in claim 1 characterized further in that said spring means comprises a circular spring extending around the outer periphery of the disc and constantly urging the segments of the disc inwardly into engagement with said plates.

4. Apparatus as defined in claim 3 characterized further in that said disc is formed in three segments of equal surface area.

References Cited in the file of this patent

UNITED STATES PATENTS

| 1,029,302 | Kindberg | June 11, 1912 |
| 1,357,403 | Kinble | Nov. 2, 1920 |
| 2,493,232 | Dodge | Jan. 3, 1950 |

FOREIGN PATENTS

| 616,607 | Great Britain | Jan. 25, 1949 |